(12) United States Patent
Tanaka et al.

(10) Patent No.: US 11,948,363 B2
(45) Date of Patent: Apr. 2, 2024

(54) PERSON DETECTION DEVICE AND PERSON DETECTION METHOD

(71) Applicant: OMRON Corporation, Kyoto (JP)

(72) Inventors: Kiyoaki Tanaka, Kyoto (JP); Ayana Tsuji, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 379 days.

(21) Appl. No.: 17/599,679

(22) PCT Filed: Feb. 19, 2020

(86) PCT No.: PCT/JP2020/006537
§ 371 (c)(1),
(2) Date: Sep. 29, 2021

(87) PCT Pub. No.: WO2020/202865
PCT Pub. Date: Oct. 8, 2020

(65) Prior Publication Data
US 2022/0198803 A1 Jun. 23, 2022

(30) Foreign Application Priority Data
Apr. 1, 2019 (JP) .................. 2019-069969

(51) Int. Cl.
*G06V 20/52* (2022.01)
*G06V 40/10* (2022.01)
(52) U.S. Cl.
CPC ............ *G06V 20/52* (2022.01); *G06V 40/103* (2022.01)

(58) Field of Classification Search
None
See application file for complete search history.

(56) References Cited

U.S. PATENT DOCUMENTS

2013/0129148 A1 5/2013 Nanri et al.
2013/0321625 A1* 12/2013 Yanagihara .............. H04R 1/32
348/143

(Continued)

FOREIGN PATENT DOCUMENTS

| CN | 103052968 A | 4/2013 |
|---|---|---|
| JP | H11261868 A | 9/1999 |

(Continued)

OTHER PUBLICATIONS

International Search Report issued in Intl. Appln. No. PCT/JP2020/006537 dated May 19, 2020. English translation provided.

(Continued)

*Primary Examiner* — Bernard Krasnic
(74) *Attorney, Agent, or Firm* — ROSSI, KIMMS & McDOWELL LLP (57) ABSTRACT

A human detection device, which analyzes a fisheye image obtained by a fisheye camera installed above a detection target area to detect a person present in the detection target area, includes: a detector configured to detect a human body candidate and an object from a fisheye image; and an erroneous detection determination unit configured to determine whether or not the human body candidate has been erroneously detected based on a positional relationship between a detection position of the human body candidate and a detection position of the object present around the human body candidate.

6 Claims, 9 Drawing Sheets

(56) References Cited

U.S. PATENT DOCUMENTS

| | | | | |
|---|---|---|---|---|
| 2014/0193034 A1* | 7/2014 | Oami | ................... | G06V 40/10 |
| | | | | 382/103 |
| 2016/0028951 A1 | 1/2016 | Mayuzumi | | |
| 2019/0287212 A1* | 9/2019 | Yanagisawa | ........... | H04N 23/61 |

FOREIGN PATENT DOCUMENTS

| | | | | | |
|---|---|---|---|---|---|
| JP | 2011061511 | A | * | 3/2011 | |
| JP | 4744823 | B2 | * | 8/2011 | ............. B60R 1/00 |
| JP | 2012100082 | A | | 5/2012 | |
| JP | 2013109696 | A | | 6/2013 | |
| JP | 2016025516 | A | | 2/2016 | |
| JP | 2016039539 | A | | 3/2016 | |
| JP | 2016157170 | A | | 9/2016 | |
| JP | 2016170502 | A | | 9/2016 | |
| JP | 2017227957 | A | | 12/2017 | |
| KR | 101738514 | B1 | | 6/2017 | |

OTHER PUBLICATIONS

Written Opinion issued in Intl. Appln. No. PCT/JP2020/006537 dated May 19, 2020. English translation provided.
Office action issued in Chinese Appln. No. 202080025635.0, dated Nov. 8, 2023. English translation provided.

* cited by examiner

Erroneous detection removal list

| Desk |
| Shelf |
| Line work table |
| Work table |
| ... |

PERSON DETECTION DEVICE AND PERSON DETECTION METHOD

TECHNICAL FIELD

The present invention relates to a technique for detecting a person by using an image of a fisheye camera.

BACKGROUND ART

In the fields of building automation (BA) and factory automation (FA), there is a need for an application that automatically measures the "number", "positions", "traffic lines", and the like of people by an image sensor and optimally controls equipment such as a light or an air conditioner. In such an application, for acquiring image information in a range as wide as possible, an ultra-wide-angle camera equipped with a fisheye lens is often used (the camera is called a fisheye camera, an omnidirectional camera, a spherical camera, and the like, but all have the same meaning, and the term "fisheye camera" is used in the present specification).

An image taken by the fisheye camera is distorted greatly. Therefore, in a case where a human body, a face, or the like is detected from an image taken by the fisheye camera (hereinafter referred to as a "fisheye image"), there is commonly used a method of plainly developing the fisheye image in advance to correct the fisheye image to an image with less distortion and then performing detection processing (cf. Patent Document 1).

PRIOR ART DOCUMENT

Patent Document

Patent Document 1: Japanese Unexamined Patent Publication No. 2016-39539

SUMMARY OF THE INVENTION

Problems to be Solved by the Invention

However, the conventional technique has the following problems. One problem is that the entire processing cost increases since the preprocessing of plainly developing the fisheye image occurs. This makes real-time detection processing difficult and may lead to a delay in equipment control, which is not preferable. The second problem is that there is a possibility that an image of a person or an object present just at a position of a boundary (a break of an image) at the time of planner development, such as immediately below the fisheye camera, is greatly deformed by the planner development processing or the image is divided, and correct detection cannot be performed.

To avoid these problems, the present inventors have studied an approach of subjecting the fisheye image as it is (meaning "without planner development") to detection processing. However, in the case of the fisheye image, variation in how a person to be detected looks (the tilt, distortion, and size of a human body) increases as compared to a normal camera image, and hence the detection becomes difficult. In particular, when an application such as BA or FA is assumed, there are many objects in an image that are likely to be mistaken as a human body or a head, such as a chair, a personal computer, a trash box, an electric fan, and a circulator. For this reason, erroneous detection that an object is recognized as a human body increases, and detection accuracy tends to deteriorate.

The present invention has been made in view of the above circumstances, and an object thereof is to provide a technique for detecting a person from a fisheye image at high speed and with high accuracy.

Means for Solving the Problem

In order to achieve the above object, the present invention adopts the following configuration.

A first aspect of the present invention provides a human detection device that analyzes a fisheye image obtained by a fisheye camera installed above a detection target area to detect a person present in the detection target area, the human detection device including: a detector configured to detect a human body candidate and an object from a fisheye image; and an erroneous detection determination unit configured to determine whether the human body candidate is erroneously detected based on a positional relationship between a detection position of the human body candidate and a detection position of the object present around the human body candidate.

The "fisheye camera" is a camera equipped with a fisheye lens and is a camera capable of photographing at an ultra-wide-angle as compared to a normal camera. An omnidirectional camera and a spherical camera are also types of the fisheye camera. The fisheye camera may be installed so as to look down the detection target area from above the detection target area. Typically, the fisheye camera is installed such that the optical axis of the fisheye camera faces vertically downward, but the optical axis of the fisheye camera may be inclined with respect to the vertical direction.

The "human body" may be a whole human body or a half body (e.g., upper body, head, torso, etc.). The detection result detected as the human body can include an object that is not a human body, and hence the detection result is also referred to as a "human body candidate" at the detection stage. Examples of the "object" include a chair, a desk, and a shelf in an office, a work table in a factory, and various devices. For the "detection position of the human body candidate", a positional relationship with the detection position of the object may be specified as the entire region surrounding the human body candidate, or a positional relationship with the detection position of the object may be specified as the center coordinates of the region surrounding the human body candidate. Similarly, the "detection position of the object" may be the entire region surrounding the object or may be the center coordinates of the region surrounding the object. The "positional relationship" includes a positional relationship in which the human body candidate and the object overlap each other, a positional relationship in which the human body candidate is present adjacent to the object, and the like.

In the present invention, the validity of the positional relationship between the detected detection position of the human body candidate and the detection position of the object present around the human body candidate is verified to perform the erroneous detection determination, so that the highly accurate human detection can be achieved by simple processing. Moreover, since preprocessing such as planner development of the fisheye image is unnecessary, high-speed processing can be achieved. In addition, from the viewpoint of equipment management, it is possible to suitably control a light or an air conditioner due to improvement in the accuracy of human detection.

The detector may specify a type of the object, and the erroneous detection determination unit may determine whether the human body candidate is erroneously detected based on the type of the object.

Depending on the type of the object, the positional relationship with the assumed human body differs. For example, a human body sits on a chair but does not sit on a desk. As described above, in the present invention, the human body can be detected more accurately by verifying the validity of the positional relationship between the detection position of the human body candidate and the detection position of the object in consideration of the type of the object to perform erroneous detection determination.

The detector may set an excluded region of the object, and the erroneous detection determination unit may determine whether the human body candidate is erroneously detected based on a positional relationship between the detection position of the human body candidate and the excluded region of the object. The "excluded region" is a region assumed not to overlap the human body in the region surrounding the object. For example, when the detection position of the human body candidate overlaps the excluded region, or when the center of the human body candidate is included in the excluded region, the detector can determine that the detection of the human body candidate has been erroneous detection. The excluded region may be preset for a known object. The excluded region may be a region obtained by excluding a region with a predetermined width from the periphery in the region surrounding the object. In the present invention, a human body can be detected more accurately by verifying the validity of the positional relationship between the detection position of the human body candidate and the excluded region of the object to perform erroneous detection determination.

The erroneous detection determination unit may determine whether the human body candidate is erroneously detected based on a ratio at which a region surrounding the human body candidate overlaps a region surrounding the object or the excluded region of the object.

The ratio of the overlapping region can be calculated by dividing the area of the overlapping region by the area of the region surrounding the human body candidate. The erroneous detection determination unit can determine that the detection of the human body candidate has been erroneous detection when the calculated ratio is larger than a predetermined threshold. In the present invention, a human body can be detected more accurately by verifying the validity of the positional relationship depending on how much a human body candidate and an object overlap to perform erroneous detection determination.

Another aspect of the present invention provides a human detection device that analyzes a fisheye image obtained by a fisheye camera installed above a detection target area to detect a person present in the detection target area, the human detection device including: a detector configured to detect a human body candidate and an object from a fisheye image; and a posture estimator configured to estimate a posture of the human body candidate based on a positional relationship between a detection position of the human body candidate and a detection position of the object present around the human body candidate. The posture estimator can estimate a posture such as whether a human body is standing or sitting based on a positional relationship with an object. The human detection device can more accurately detect a human body, including the posture of a person. By estimating the posture of the person, it is possible to suitably control the equipment management such as a light or an air conditioner.

The posture estimator may estimate a motion of the human body candidate based on a change in the positional relationship, from a frame before the fisheye image, in the positional relationship between the detection position of the human body candidate and the detection position of the object. The motion of the human body can be estimated from a change in the positional relationship between the detection position of the human body candidate and the detection position of the object. The posture estimator can estimate a motion such as a human body rising or sitting based on a change in the positional relationship with the object. The human detection device can more accurately detect the human body, including the motion of a person. By estimating the motion of the person, it is possible to suitably control the equipment management such as a light or an air conditioner.

A second aspect of the present invention provides a human detection method for analyzing a fisheye image obtained by a fisheye camera installed above a detection target area to detect a person present in the detection target area, the human detection method including: a detection step of detecting a human body candidate and an object from a fisheye image; and an erroneous detection determination step of determining whether the human body candidate is erroneously detected based on a positional relationship between a detection position of the human body candidate and a detection position of the object present around the human body candidate.

The present invention may be regarded as a human detection device having at least a part of the above means or may be regarded as a person recognition device that recognizes (identifies) a detected person, a person tracking device that tracks a detected person, an image processing device, or a monitoring system. Further, the present invention may be regarded as a human detection method including at least a part of the above processing, a person recognition method, a person tracking method, an image processing method, or a monitoring method. Moreover, the present invention can also be regarded as a program for achieving such a method or a recording medium in which the program is recorded non-temporarily. Note that each of the means and the processing can be combined as much as possible to constitute the present invention.

Effect of the Invention

According to the present invention, it is possible to provide a technique for detecting a person from a fisheye image at high speed and with high accuracy.

MODE FOR CARRYING OUT THE INVENTION

Application Example

Figure 1:
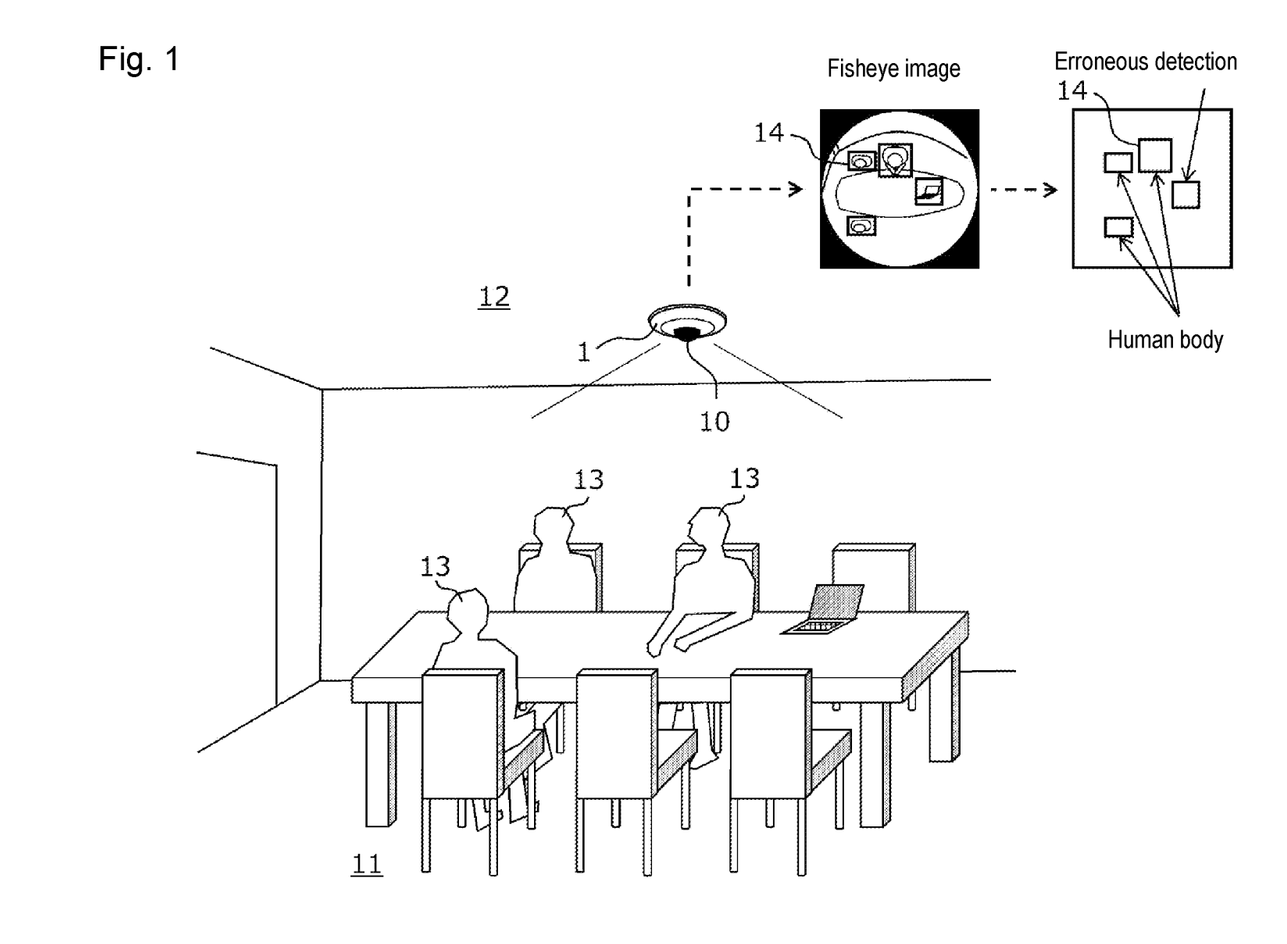
FIG. 1 is a view illustrating an application example of a human detection device according to the present invention.

An application example of the human detection device according to the present invention will be described with reference to FIG. 1. A human detection device 1 is a device that analyzes a fisheye image obtained by a fisheye camera 10 installed above a detection target area 11 (e.g., ceiling 12) to detect a person 13 present in the detection target area 11. The human detection device 1 performs detection, recognition, tracking, and the like, on the person 13 working in the detection target area 11, for example, in an office, a factory, or the like.

The human detection device 1 detects a human body candidate from a fisheye image. In the example of FIG. 1, respective regions of three human bodies detected from the fisheye image are indicated by rectangular bounding boxes 14 In addition, a notebook computer placed on a desk has been erroneously detected as a human body and is indicated by a bounding box 14. The bounding box 14 is a closed figure or a frame line representing a region surrounding the human body candidate. The detection result of the human body candidate includes the detection position of the human body candidate.

The human detection device 1 also detects an object from the fisheye image. The detected object may be indicated by a bounding box distinguishably from the bounding box 14 of the human body candidate. The human detection device 1 can also specify the type of the object such as a desk, a chair, a work table, or a platform by using a dictionary prepared in advance for detecting the object. The detection result of the object includes the detection position of the object and the type of the object.

The human detection device 1 specifies an object present around the human body candidate and determines whether or not the human body candidate has been erroneously detected based on a positional relationship between the detection position of the human body candidate and the detection position of the object present around the human body candidate. The human body candidate determined to have been erroneously detected is excluded from the detection result of the human body. The detection result of the human body obtained by the human detection device 1 is output to an external device and is used, for example, for counting of the number of people, control of various equipment such as a light and an air conditioner, monitoring of a suspicious person, and the like.

When the detection target area 11 is photographed so as to be looked down by the fisheye camera 10, how the human body looks (how the human body appears) greatly changes depending on the positional relationship with the fisheye camera 10. Hence the fisheye image has a characteristic that the shape and size of the bounding box 14 change in accordance with the detection position on the image. The human detection device 1 has one of features in performing erroneous detection determination by a simple method of verifying the validity of the shape and size of the bounding box 14 of the detected human body candidate in consideration of such a characteristic of the fisheye image, thereby determining whether or not the human body candidate has been detected erroneously. The human detection device 1 also has one of features in using the fisheye image as it is (i.e., without performing preprocessing such as planner development and distortion correction) for the human detection processing.

Embodiment (Characteristics of Fisheye Image)

Figure 2:
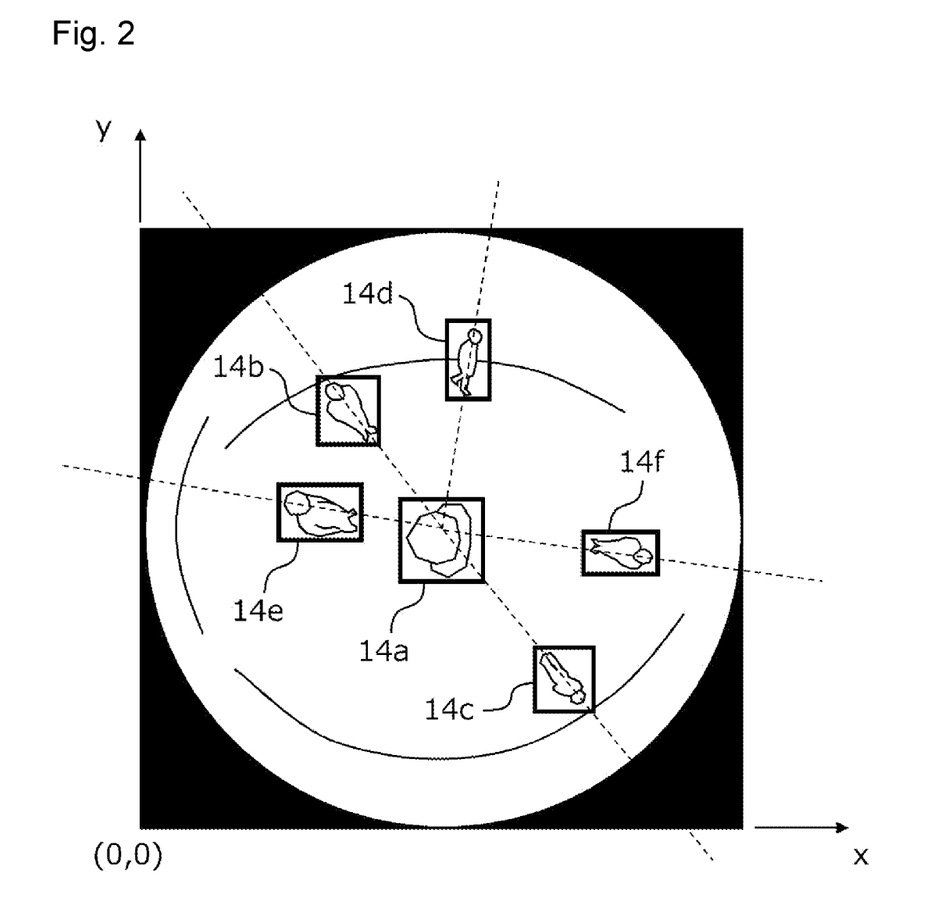
FIG. 2 is a view illustrating an example of a fisheye image and bounding boxes.

FIG. 2 illustrates an example of a fisheye image captured from the fisheye camera 10. The image coordinate system has an origin (0, 0) at the lower-left corner of the fisheye image, an x-axis on the right side in the horizontal direction, and a y-axis on the upper side in the vertical direction.

When the fisheye camera 10 is installed such that an optical axis is vertically downward, an image obtained by observing a person present immediately below the fisheye camera 10 from the top of the head appears at the center of the fisheye image. Then, a depression angle decreases toward the end of the fisheye image, and an image of a person observed obliquely from above appears. When the human body in the fisheye image is upright, the human body appears at such an angle that the feet are located on the center side of the image, the head is located on the end side of the image, and the human body is substantially parallel to a radial line (broken line in FIG. 2) passing through the center of the image. Although distortion is relatively small at the center of the fisheye image, the distortion of the image becomes larger toward the end of the fisheye image.

Reference numerals 14a to 14f denote bounding boxes disposed so as to surround the region of the human body in the fisheye image. In the embodiment, a rectangular bounding box including four sides parallel to the x-axis or the y-axis is used for the convenience of image processing.

As illustrated in FIG. 2, the bounding box (e.g., 14a) present in the central area of the fisheye image is substantially square. The bounding box (e.g., 14b, 14c) present in an area at an angle of 45 degrees with respect to the central area is also substantially square. The bounding boxes (e.g., 14d) present in the upper and lower areas of the central area are vertically long rectangles (rectangles with long sides parallel to the y-axis), which become more square as approaching the center of the image and become more vertically long as separating from the center of the image. The bounding boxes (e.g., 14e, 14f) present in the left and right areas of the central area are horizontally long rectangles (rectangles with long sides parallel to the x-axis), which become more square as approaching the center of the image and become more horizontally long as separating from the center of the image.

As described above, the fisheye image has a characteristic that the shape (e.g., aspect ratio) of the bounding box changes depending on the direction and the distance with respect to the image center. The aspect ratio of the bounding box for each position or area on the fisheye image can be geometrically calculated (predicted) based on the optical characteristics of the fisheye camera 10, the positional relationship between the fisheye camera 10 and the detection target area 11, and the average size of the human body.

Further, as illustrated in FIG. 2, the size of the human body is the largest at the center of the fisheye image and becomes smaller toward the end. That is, the fisheye image has a characteristic that the size (e.g., area) of the bounding box changes depending on the distance with respect to the image center (the size decreases as the distance increases). The area of the bounding box for each position or area on the fisheye image can also be geometrically calculated (predicted) based on the optical characteristics of the fisheye camera 10, the positional relationship between the fisheye camera 10 and the detection target area 11, and the average size of the human body.

(Monitoring System)

Figure 3:
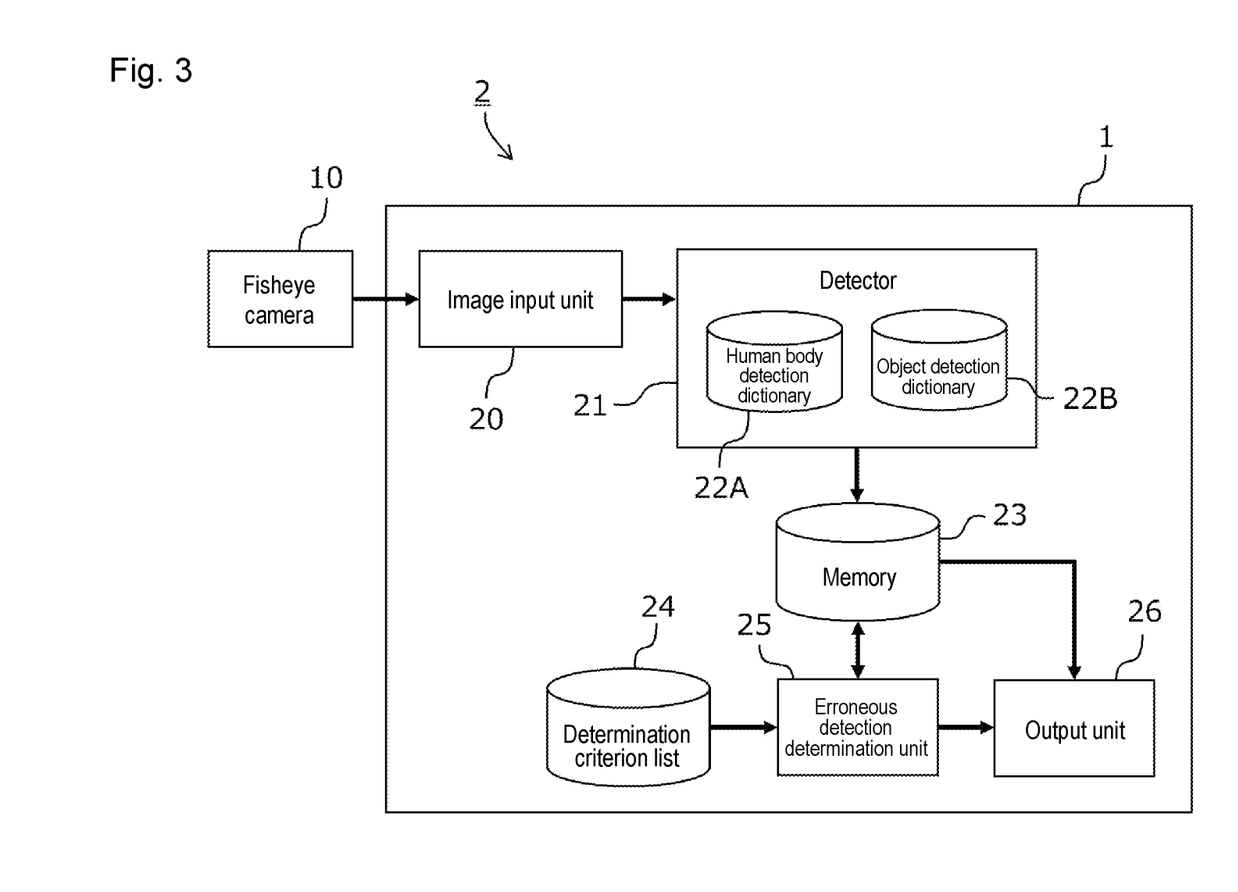
FIG. 3 is a diagram illustrating a configuration example of a monitoring system including a human detection device.

The embodiment of the present invention will be described with reference to FIG. 3. FIG. 3 is a block diagram illustrating a configuration of a monitoring system 2 to which the human detection device 1 according to the embodiment of the present invention is applied. The monitoring system 2 includes the fisheye camera 10 and the human detection device 1.

The fisheye camera 10 is an imaging device having an optical system that includes a fisheye lens and an imaging element (an image sensor such as a charge-coupled device (CCD) or a complementary metal-oxide semiconductor (CMOS). For example, as illustrated in FIG. 1, the fisheye camera 10 may be installed on a ceiling 12 of the detection target area 11 or the like in a state where the optical axis is directed vertically downward and may take images in all directions (360 degrees) of the detection target area 11. The fisheye camera 10 is connected to the human detection device 1 by a wire (universal serial bus (USB) cable, local area network (LAN) cable, etc.) or a radio (WiFi or the like), and image data taken by the fisheye camera 10 is captured in the human detection device 1. The image data may be either a monochrome image or a color image, and the resolution, frame rate, and format of the image data are arbitrary. In the embodiment, it is assumed that a monochrome image captured at 10 fps (10 images per second) is used.

The human detection device 1 of the embodiment includes an image input unit 20, a detector 21, a memory 23, a determination criterion list 24, an erroneous detection determination unit 25, and an output unit 26. The image input unit 20 has a function of capturing image data from the fisheye camera 10. The captured image data is delivered to the detector 21. The image data may be stored into the memory 23.

The detector 21 has a function of detecting a human body candidate from a fisheye image by using an algorithm for detecting a human body. A human body detection dictionary 22A is a dictionary in which an image feature of a human body appearing in a fisheye image is registered in advance. Also, the detector 21 has a function of detecting an object present around the human body from the fisheye image by using an algorithm for detecting an object that is not a human body. An object detection dictionary 22B is a dictionary in which an image feature of an object appearing in the fisheye image is registered in advance. In the object detection dictionary 22B, image features are registered for each type of object such as a desk, a chair, a shelf, and a stepladder. The detector 21 can specify the type of the detected object with reference to the object detection dictionary 22B.

The memory 23 has a function of storing a fisheye image, a detection result, and the like. The memory 23 separately stores the human body and the object detected by the detector 21. The determination criterion list 24 has a function of storing information used for determining whether or not there is an erroneous detection or recognizing the posture of the human body based on the positional relationship between the human body and the object. This information is set in advance prior to the operation of the monitoring system 2 (e.g., at the time of factory shipment, installation, maintenance, or the like of the monitoring system 2). In addition, the information may be updated after the operation of the monitoring system 2.

The erroneous detection determination unit 25 has a function of verifying the detection result obtained by the detector 21 and determining whether or not there is erroneous detection. The output unit 26 has a function of outputting information such as a fisheye image and a detection result to the external device. For example, the output unit 26 may display information on a display as the external device, may transfer information to a computer as the external device, or may transmit information or a control signal to a lighting device, an air conditioner, or a factory automation (FA) device as the external device.

The human detection device 1 can be formed of, for example, a computer including a central processing unit (CPU) (processor), a memory, storage, and the like. In this case, the configuration illustrated in FIG. 3 is achieved by loading a program stored in the storage into the memory and executing the program by the CPU. Such a computer may be a general-purpose computer such as a personal computer, a server computer, a tablet terminal, or a smartphone or may be an embedded computer such as an onboard computer. Alternatively, all or a part of the configuration illustrated in FIG. 3 may be formed by an application-specific integrated circuit (ASIC), a field-programmable gate array (FPGA), or the like. Alternatively, all or a part of the configuration illustrated in FIG. 3 may be achieved by cloud computing or distributed computing.

(Human Detection Processing)

Figure 4:
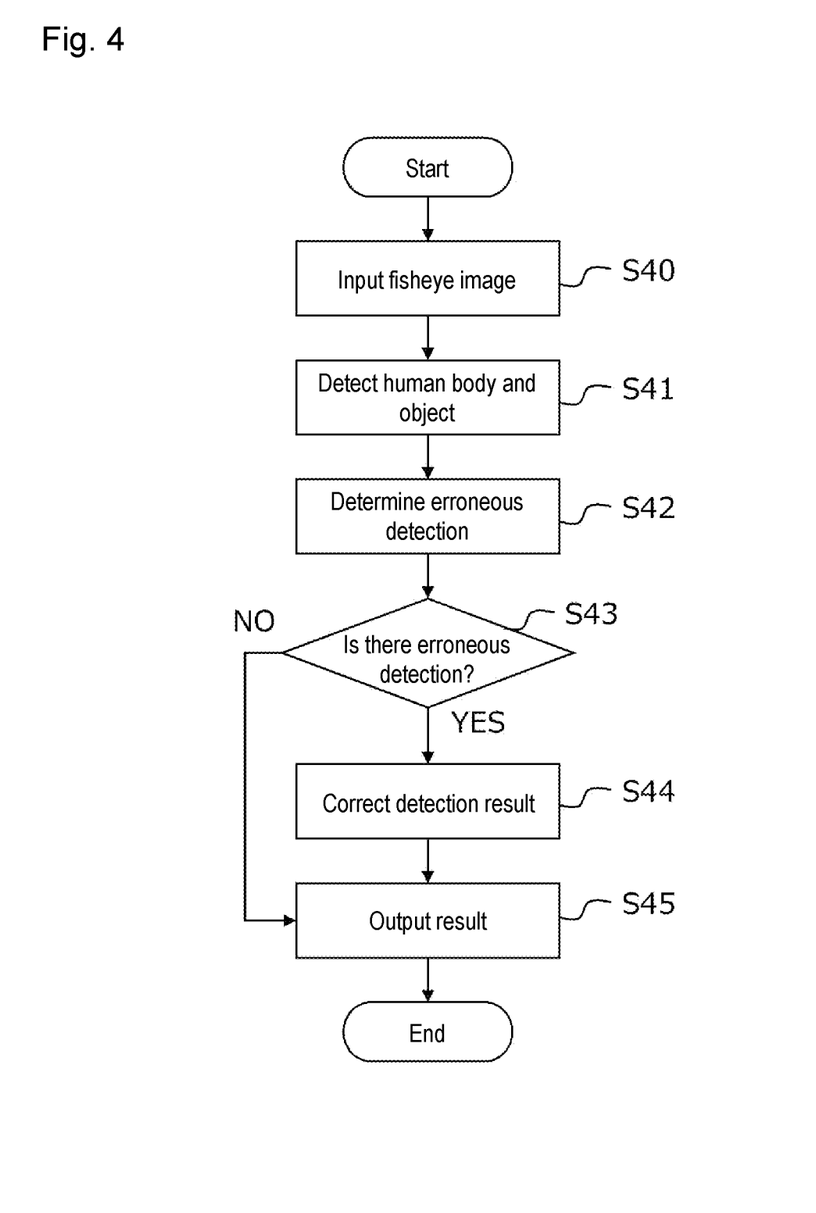
FIG. 4 is a flowchart of human detection processing.

FIG. 4 is a flowchart of human detection processing by the human detection device 1. An overall flow of the human detection processing will be described with reference to FIG. 4. Note that the flowchart of FIG. 4 illustrates processing for a fisheye image of one frame. In a case where the fisheye image is input at 10 fps, the processing of FIG. 4 is executed 10 times in a second.

First, the image input unit 20 receives a fisheye image of one frame from the fisheye camera 10 (step S40). As described in BACKGROUND ART, conventionally, image processing such as detection and recognition has been performed after creation of a plainly developed image with corrected distortion of a fisheye image. However, in the monitoring system 2 of the embodiment, the fisheye image is used as it is (while remaining distorted) for detection and recognition processing.

Next, the detector 21 detects a human body and an object present around the human body from the fisheye image (step S41). When there is a plurality of people in the fisheye image, a plurality of human bodies and an object present around each human body are detected. The detector 21 may execute processing of detecting a human body and detecting an object present around the human body for each human body. Further, after detecting the human body and the object included in the fisheye image, the detector 21 may specify an object present around each detected human body. The detector 21 can store the detected human body and the object present around the human body into the memory 23 in association with each other.

The detector 21 identifies the type of the detected object (desk, chair, shelve, stepladder, etc.). The identification of the type of the object is also referred to as object recognition. The detection result of the object detected by the detector 21 is used for the determination of erroneous detection of a human body.

Here, the detection of the human body in step S41 will be described. The detector 21 may erroneously detect an object that is not a human body (e.g., an electric fan, a desk chair, a coat hook, or the like, which is confusing in shape and color with a human body) as a human body. Since the detection result detected as a human body by the detector 21 can include an object that is not a human body, the object is referred to as a "human body candidate" at this stage.

Figure 5:
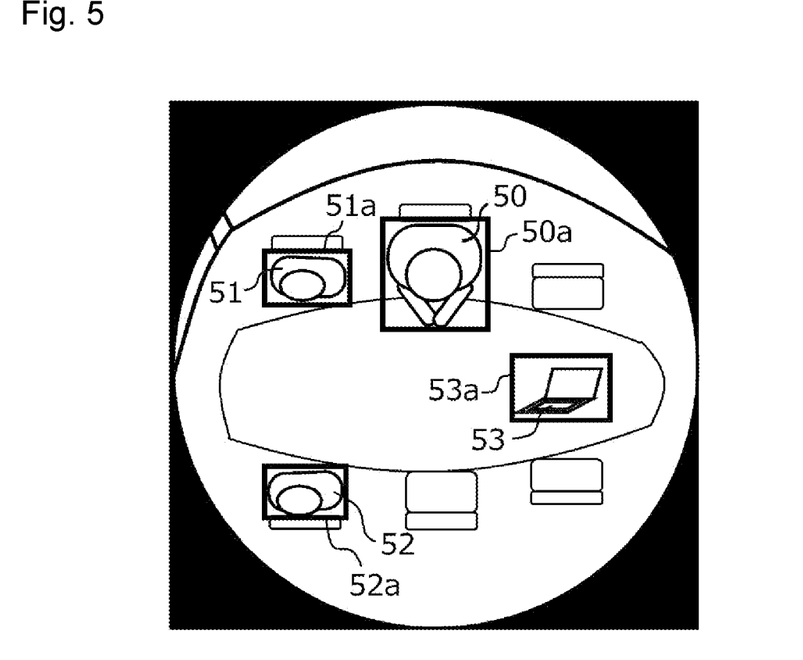
FIG. 5 is a view illustrating an example of a detection result of human body candidates obtained by a detector.

FIG. 5 is an example of a detection result of human body candidates obtained by the detector 21. In this example, in addition to human bodies 50, 51, 52, an object 53 that is not a human body has also been detected as a human body candidate. Reference numerals 50a to 53a denote bounding boxes of the respective human body candidates.

The detection result of the human body candidates may include, for example, information of a bounding box indicating a region of the detected human body candidate and information of the reliability of detection (the certainty of being a human body). The information of the bounding box may include, for example, center coordinates (x, y), a height h, and a width w of the bounding box (corresponding to the detection position of the human body candidate). The detection result of the human body candidates is stored into the memory 23.

Note that any algorithm may be used for human body detection. For example, an identifier combining an image feature such as the histogram of oriented gradients (HoG) or Haar-like and boosting may be used, or human body recognition by deep learning (e.g., Region Based Convolutional Neural Networks (R-CNN), Fast R-CNN, You Only Look Once (YOLO), Single Shot Multibox Detector (SSD), etc.) may be used. In the embodiment, the whole body of a person is detected as the human body, but the present invention is not limited thereto, and a part of the body such as the upper body may be used as a detection target.

Figure 6:
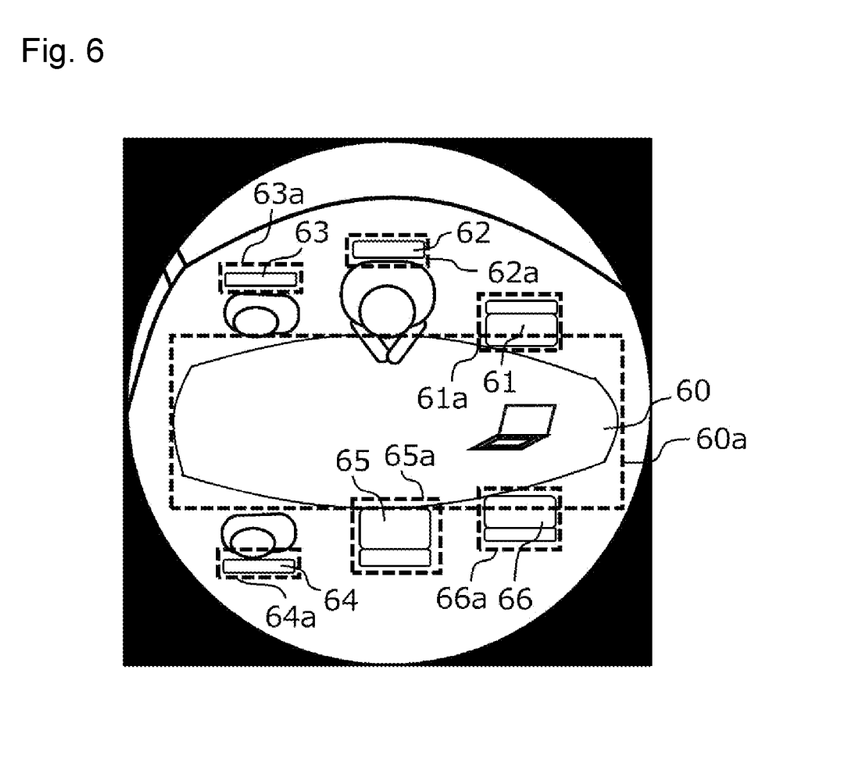
FIG. 6 is a view illustrating an example of a detection result of objects obtained by a detector.

Next, the detection of the object in step S41 will be described. FIG. 6 is an example of a detection result of objects obtained by the detector 21. In this example, objects 60 to 66 have been detected. The detection result of the objects includes, for example, information of a bounding box indicating the region of the detected object and the type of the object. The information of the bounding box may include, for example, center coordinates (x, y), a height h, and a width w of the bounding box (corresponding to the detection position of the object). The information of the bounding box is stored into the memory 23.

The object 60 is recognized as a desk, and "desk" is stored into the memory 23 as the type of the object. The objects 61 to 66 are recognized as chairs, and "chair" is stored into the memory 23 as the type of each of the objects. Reference numeral 60a denotes the bounding box of the object 60 (desk), and reference numerals 61a to 66a denote the bounding boxes of the objects 61 to 66 (chairs). Note that the detection result of the objects illustrated in FIG. 6 may be superimposed on the detection result of the human body candidates illustrated in FIG. 5 and displayed on the display as the external device via the output unit 26.

Note that any algorithm may be used for object detection and object recognition, and detection and recognition by boosting (machine learning) or deep learning can be performed similarly to human body detection. In the object recognition by machine learning, it is also possible to cause an object present in the detection target area 11 to be learned in advance as teacher data.

Next, the erroneous detection determination unit 25 determines erroneous detection for each of the bounding boxes 50a to 53a included in the detection result of the human body candidates obtained by the detector 21 (step S42). Whether or not the human body candidate has been erroneously detected is determined based on a positional relationship between each human body candidate and the object detected in step S41. For example, when the ratio of the region overlapping another object is larger than a predetermined threshold, that is, when the human body candidate is present on another object, it is assumed that the human body candidate is not a human body. In the example of FIG. 5, since the human body candidate 53 entirely overlaps the desk, it is determined that the human body candidate is not a human body and has been erroneously detected. Details of the erroneous detection determination will be described later.

When a human body candidate determined to have been erroneously detected (i.e., not to be a human body) is found (YES in step S43), the erroneous detection determination unit 25 corrects the detection result stored in the memory 23 (step S44). Specifically, the erroneous detection determination unit 25 may exclude the information on the human body candidate determined to have been erroneously detected from the detection result or may lower the reliability of the human body candidate determined to have been erroneously detected. Finally, the output unit 26 outputs the detection result to the external device (step S45). Thus, the processing on the fisheye image of one frame ends.

According to the human detection processing of the embodiment, the fisheye image is analyzed as it is, and human detection is directly performed from the fisheye image. Therefore, preprocessing such as planner development and distortion correction of the fisheye image can be omitted, and high-speed human detection processing can be performed. The method of using the fisheye image as it is for the detection processing has a problem that the detection accuracy deteriorates as compared to the method of performing the detection processing after planner development (distortion correction). In the embodiment, since erroneous detection is eliminated by verifying a positional relationship with an object present around a human body, highly accurate detection can be achieved.

(Erroneous Detection Determination)

A specific example of the erroneous detection determination by the erroneous detection determination unit 25 will be described. Based on a positional relationship between a detection position of a human body candidate and a detection position of an object present around the human body candidate, the erroneous detection determination unit 25 determines whether or not the human body candidate has been erroneously detected. The positional relationship includes, for example, a positional relationship in which the human body candidate and the object overlap each other, and a positional relationship in which the human body candidate is present adjacent to the object. The erroneous detection determination unit 25 may further determine the erroneous detection in accordance with the type of the overlapping object or the type of the adjacent object. In addition, the erroneous detection determination unit 25 may determine the erroneous detection in accordance with the degree of overlapping between the human body candidate and the object or the distance between the human body candidate and the adjacent object.

(1) Determination Based on Positional Relationship and Type of Object

It is assumed that a person is present at a position adjacent to a desk in a conference room or a work table in a factory or is present with hands overlapping each other, but does not get on the desk or the work table. On the other hand, a person may sit on or go up on a chair, a stepladder, or the like. As thus described, when the human body candidate being the determination target is in a positional relationship that overlaps the object or is adjacent to the object, it is possible to determine whether or not the human body candidate is a human body based on the type of the object. Here, the determination of erroneous detection when the human body candidate overlaps the object will be described.

Figure 7:
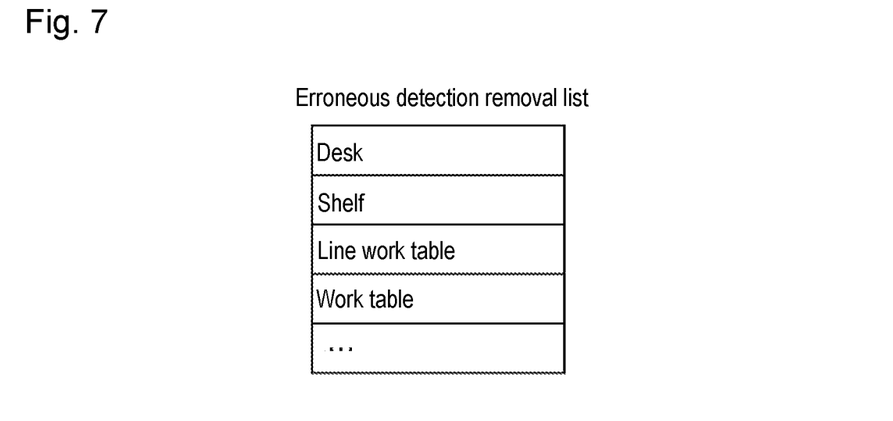
FIG. 7 is a diagram illustrating an erroneous detection removal list.

The object detected in step S41 is stored into the memory 23 together with the type of the object. The determination criterion list 24 includes an erroneous detection removal list that defines a type of an object assumed not to be overlapped by a person. FIG. 7 is a diagram illustrating the erroneous detection removal list. As illustrated in FIG. 7, a desk, a shelf, a line work table (work table for performing a series of processes such as production and assembly by flow work), a work table, and the like are objects that are each assumed not to be overlapped by a person.

The erroneous detection determination unit 25 specifies an object that overlaps the human body candidate being the determination target among the objects detected in step S41. The center coordinates (x, y), the height h, and the width w of the bounding box of the object detected in step S41 are stored in the memory 23. Thus, the erroneous detection determination unit 25 specifies an object, in which the bounding box of the human body candidate and the bounding box of the object overlap, as the object overlapping the human body candidate. Whether or not the bounding box of the human body candidate and the bounding box of the object overlap can be determined using the distance between the center coordinates of each bounding box, and the height h and the width w of each bounding box.

When an object overlapping each human body candidate is specified and detected for each human body candidate in step S41, each human body candidate is stored into the memory 23 in association with the object overlapping each human body candidate. In this case, the erroneous detection determination unit 25 can acquire (specify) an object overlapping the human body candidate with reference to the memory 23.

The erroneous detection determination unit 25 acquires the type of the object from the detection result of the object overlapping the human body candidate. The erroneous detection determination unit 25 determines whether or not the acquired type of the object is included in the erroneous detection removal list illustrated in FIG. 7. When the type of the object is included in the erroneous detection removal list, the erroneous detection determination unit 25 determines that the detection of the human body candidate in step S41 has been erroneous detection.

For example, the bounding box 53a of the human body candidate 53 in FIG. 5 overlaps the bounding box 60a of the object 60 in FIG. 6. The type of the object 60 is a "desk". Since the erroneous detection removal list includes "desk", the erroneous detection determination unit 25 can determine that the detection of the human body candidate 53 has been erroneous detection.

(2) Determination Based on Positional Relationship with Excluded Region of Object A person detected as a human body candidate may overlap a peripheral portion of an object by placing the hand on the end of a desk or performing work on a work table. On the other hand, in a large desk used by a plurality of people, it is considered that a person does not overlap a central portion separated from the periphery by a predetermined width. As described above, the erroneous detection determination unit 25 can determine whether or not the human body candidate is a human body based on the positional relationship between the human body candidate and the object, that is, which part of the object the human body candidate overlaps.

For example, when the center coordinates of the human body candidate are included in the excluded region set for the object overlapping the human body candidate, the erroneous detection determination unit 25 can determine that the detection of the human body candidate in step S41 has been erroneous detection. Further, when the bounding box of the human body candidate overlaps the excluded region, the erroneous detection determination unit 25 may determine that the detection of the human body candidate in step S41 has been erroneous detection.

The excluded region is set for each object detected in step S41. For example, the detector 21 can set a region, obtained by excluding a region having a predetermined width from the periphery of the bounding box, as the excluded region. Further, in an object assumed to overlap the human body on the front surface side, such as a shelf, the back surface side (the side not overlapping the human body) may be set as the excluded region. In this manner, the detector 21 can also set the excluded region based on the type of the detected object.

The detector 21 calculates the center coordinates (x, y), the height h, and the width w of the set excluded region for each detected object and stores the center coordinates, the height h, and the width w into the memory 23. The erroneous detection determination unit 25 can determine whether or not the center coordinates of the human body candidate are included in the excluded region of the overlapping object with reference to the information of the excluded region stored in the memory 23.

Figure 8:
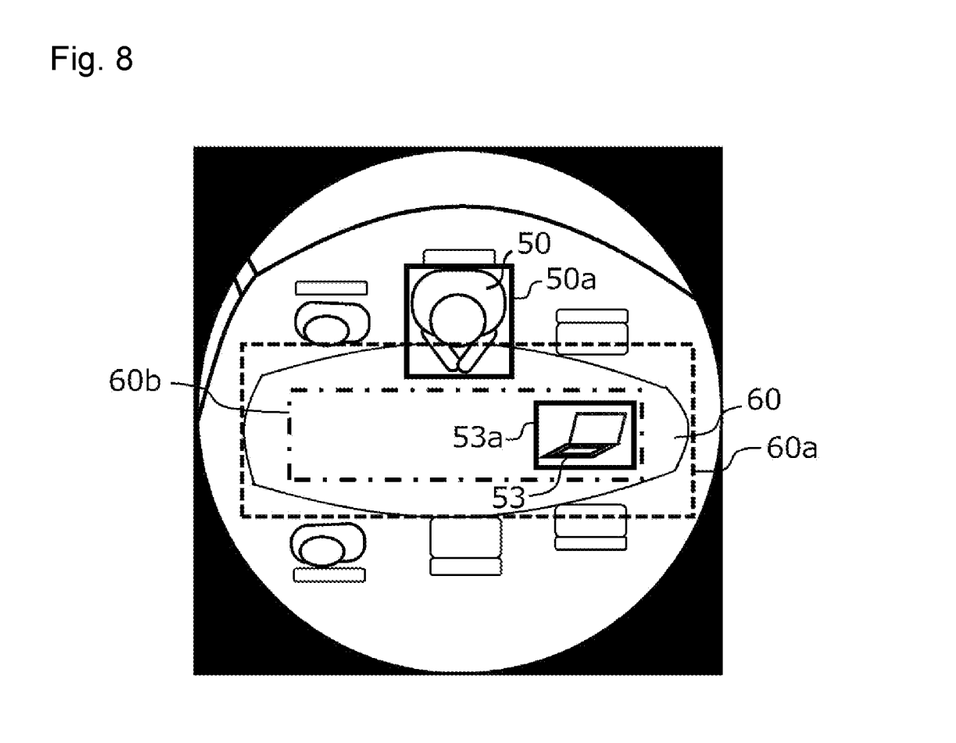
FIG. 8 is a view for explaining the determination of erroneous detection based on a positional relationship with an object.

Here, the determination of erroneous detection based on a positional relationship with an object will be described with reference to FIG. 8. An excluded region 60b indicated by a one-dot chain line is set in the object 60 (desk) detected as an object. The bounding box 50a of the human body candidate 50 overlaps the bounding box 60a of the desk 60 but does not overlap the excluded region 60b. In this case, the erroneous detection determination unit 25 can determine that the detection of the human body candidate 50 has not been erroneous detection.

Further, the bounding box 53a of the human body candidate 53 overlaps the excluded region 60b. Since the center coordinates of the bounding box 53a are included in the excluded region 60b, the erroneous detection determination unit 25 can determine that the detection of the human body candidate 53 has been erroneous detection.

(3) Determination Based on Positional Relationship Determined by Ratio of Overlapping Region with Object When the human body candidate overlaps the object, the erroneous detection determination unit 25 can determine whether or not the human body candidate is a human body by using a ratio of a region where the human body candidate overlaps the object. That is, the erroneous detection determination unit 25 can determine whether or not the human body candidate is a human body based on a positional relationship between the human body candidate and the object determined by how much the human body candidate overlaps the object.

The ratio of the region where the human body candidate overlaps the object can be calculated as, for example, a ratio of a region occupied by the bounding box of the overlapping object to the bounding box of the human body candidate. When the calculated ratio is larger than a predetermined threshold, the erroneous detection determination unit 25 determines that the detection of the human body candidate in step S41 has been erroneous detection. Note that the predetermined threshold may be determined in accordance with the type of the object. For example, the predetermined threshold can be set to 30% when the type of the object is a desk, and can be set to 80% when the type of the object is a chair. As described above, since it is assumed that the region of the chair overlapping the human body is wider than that of the desk, the predetermined threshold for the chair can be set to a value larger than that for the desk. The predetermined threshold is stored in the determination criterion list 24 in advance.

Figure 9A:
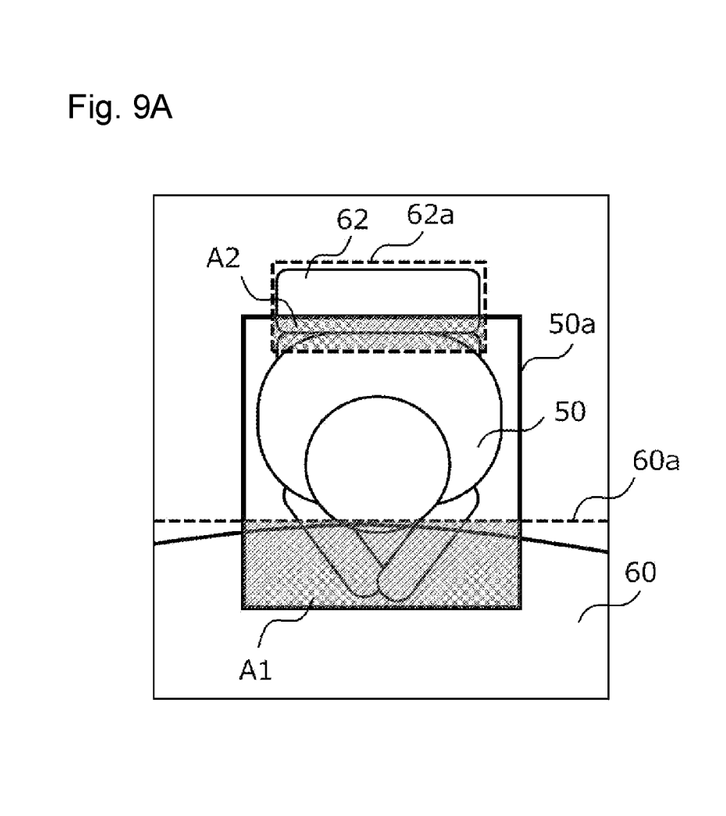
FIGS. 9A and 9B are views for explaining the determination of erroneous detection based on a ratio of a region overlapping an object.

Here, the determination of erroneous detection based on the ratio of the region overlapping the object will be described with reference to FIGS. 9A and 9B In FIG. 9A, the human body candidate 50 overlaps the desk 60 and the chair 62. A region where the bounding box 50a of the human body candidate 50 and the bounding box 60a of the desk 60 overlap is defined as a region A1. A region where the bounding box 50a of the human body candidate 50 and the bounding box 62a of the chair 62 overlap is defined as a region A2. When the ratio of the region A1 to the bounding box 50a is equal to or less than the threshold, the erroneous detection determination unit 25 can determine that the detection is not erroneous detection. When the ratio of the region A2 to the bounding box 50a is equal to or less than the threshold, the erroneous detection determination unit 25 can determine that the detection is not erroneous detection.

Figure 9B:
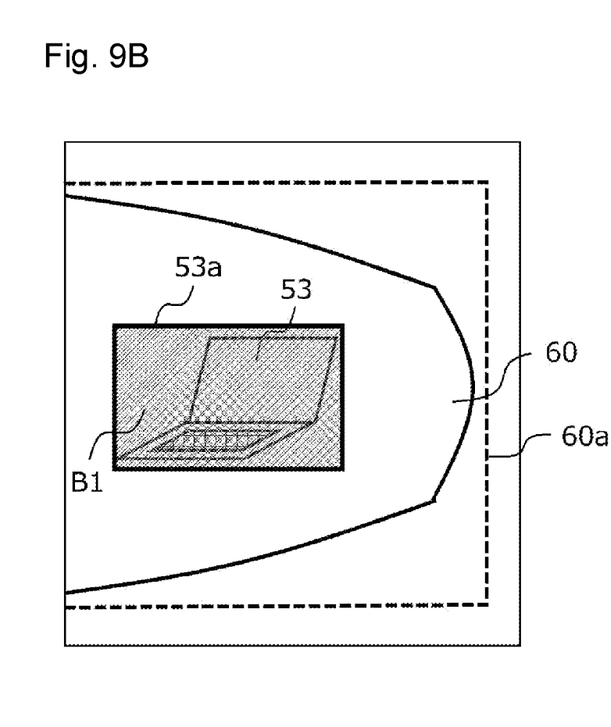

On the other hand, in FIG. 9B, the human body candidate 53 overlaps the desk 60. The bounding box 53a of the human body candidate 53 is included in the region of the bounding box 60a of the desk 60. Thus, the ratio of the region where the bounding box 60a of the desk 60 overlaps the bounding box 53a of the human body candidate 53 is 100%. When the predetermined threshold for the desk is set to 30%, the ratio of the region where the bounding box 53a overlaps the bounding box 60a exceeds the threshold. Therefore, the erroneous detection determination unit 25 can determine that the detection of the human body candidate in step S41 has been erroneous detection.

Note that the methods of erroneous detection determination of (1) to (3) described above can be combined appropriately. For example, the erroneous detection determination unit 25 may determine whether or not the detection of the human body candidate has been erroneous detection based on the ratio of the region where the bounding box of the human body candidate and the excluded region of the object overlap each other.

Effects of Embodiment

In the above embodiment, the human detection device 1 detects the human body and the object present around the human body candidate from the fisheye image. The human detection device 1 determines whether or not the detection of the human body candidate has been erroneous detection based on the positional relationship between the detection position of the human body candidate and the detection position of the object. As a result, the human detection device 1 can detect a person from the fisheye image at high speed and with high accuracy.

Further, the human detection device 1 may determine whether or not the detection of the human body candidate has been erroneous detection based on the positional relationship between the detection position of the human body candidate and the detection position of the object and the type of the object. Since the validity of the positional relationship between the human body candidate and the object is verified based on the type of the object, the human body can be detected more accurately.

Moreover, the human detection device 1 may determine whether or not the human body candidate has been erroneously detected based on the positional relationship between the detection position of the human body candidate and the excluded region of the object. The excluded region is set as a region that does not overlap the human body. Since it can be determined that the human body candidate overlapping the excluded region has been erroneously detected, the human detection device 1 can detect the human body more accurately.

Furthermore, the human detection device 1 may determine whether or not the human body candidate has been erroneously detected based on the ratio of the region where the human body candidate overlaps the object. The human detection device 1 verifies the validity of the positional relationship depending on how much the human body candidate overlaps the object to perform erroneous detection determination, so that the human body can be detected more accurately.

Modification

In the embodiment, whether or not the human body candidate has been erroneously detected is determined based on the positional relationship between the human body and surrounding objects. In contrast, in a modification, the posture of the human body is estimated based on a positional relationship between the human body and a surrounding object.

Figure 10:
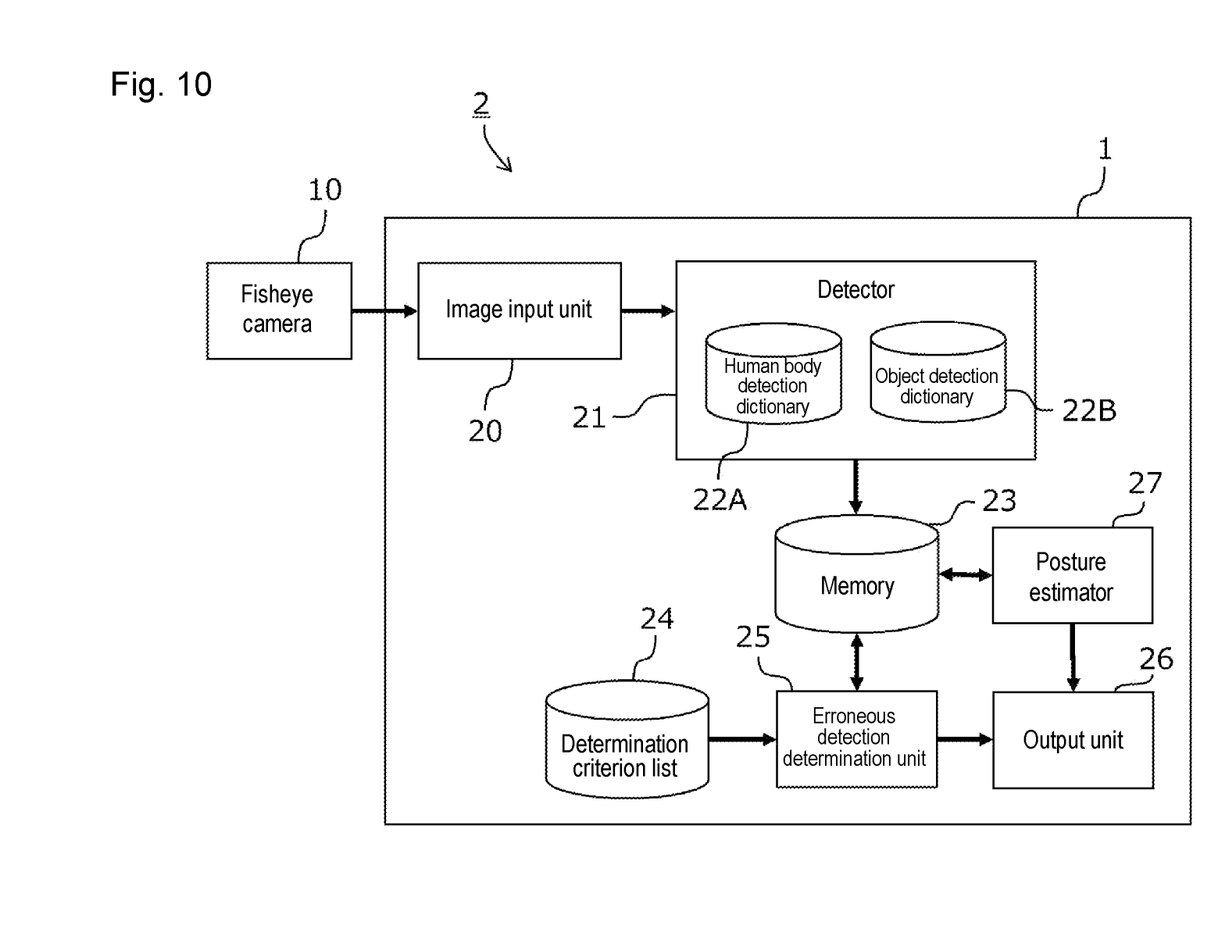
FIG. 10 is a diagram illustrating a configuration example of a monitoring system including a human detection device according to a modification.

FIG. 10 is a diagram illustrating a configuration example of a monitoring system including a human detection device according to the modification. A human detection device 1 according to the modification includes a posture estimator 27 in addition to the configuration of the embodiment illustrated in FIG. 3. The posture estimator 27 estimates the posture and the motion of the detected human body (human body candidate) based on the detection result of the human body or the object detected from the fisheye image. The posture estimator 27 can estimate the posture of the human body based on a positional relationship between the human body and the surrounding object. Further, the posture estimator 27 can estimate the motion of the human body, such as standing or sitting, based on a change in the positional relationship between the human body and the object from a frame before the current frame. The posture estimator 27 can also estimate the motion of the human body based on a change in the shape of the human body from the previous frame.

Figure 11:
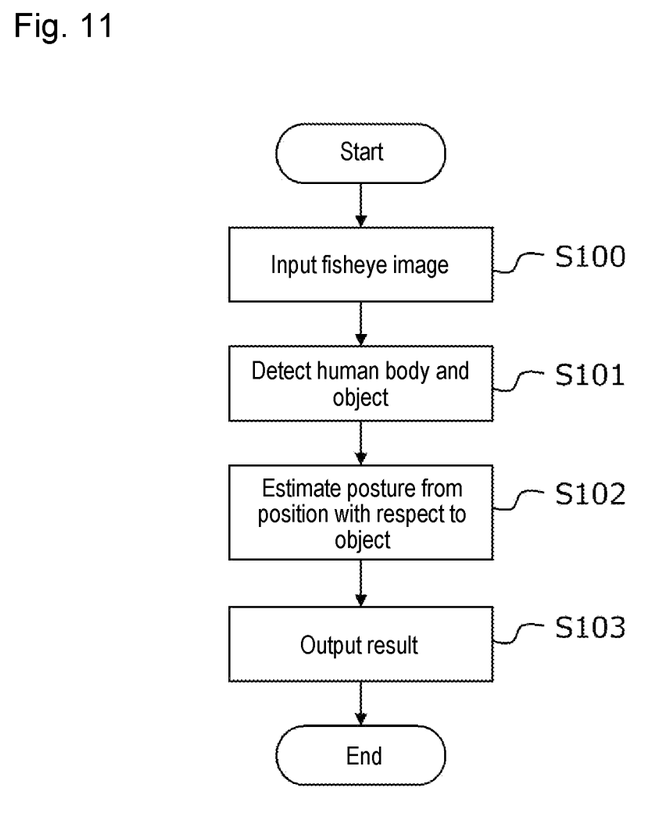
FIG. 11 is a flowchart of human posture estimation processing.

FIG. 11 is a flowchart of human posture estimation processing. An overall flow of human posture estimation will be described with reference to FIG. 11. Note that the flowchart of FIG. 11 illustrates processing for a fisheye image of one frame. In a case where the fisheye image is input at 10 fps, the processing of FIG. 11 is executed 10 times in a second. The processing in each of steps S100 and S101 is similar to the processing in each of steps S40 and S41 in FIG. 4, and hence the description thereof is omitted.

The posture estimator 27 estimates the posture and motion of a person based on the detection results of the human body and the object detected in S101 (step S102). The posture estimator 27 acquires a type of an object around the detected human body. When the object is a chair and the human body overlaps the chair, it is estimated that the detected person is sitting. Even when the object is a desk, and the human body is in front of the desk, it is estimated that the person is sitting.

The posture estimator 27 can also estimate the motion of the person with reference to the detection result in the previous frame stored in the memory 23. For example, when a chair detected in the previous frame is not detected in the current frame, and a human body is detected around the chair, the posture estimator 27 can estimate that a person who was standing has sat down. Further, when the shape of the body of the person detected in the previous frame becomes longer, the posture estimator 27 can estimate that the person has risen from the seated state. Conversely, when the shape of the body of the person detected in the previous frame becomes shorter, the posture estimator 27 can estimate that the person has sat down from the standing state.

Finally, the output unit 26 outputs the estimated result to the external device (step S103). Thus, the processing on the fisheye image of one frame ends.

Effects of Modification

It is difficult to estimate the posture or motion of the person only by analyzing the image of the human body detected from the fisheye image. In the present modification, the human detection device 1 can detect an object around the human body and estimate the posture and motion of the human body based on the positional relationship between the human body and the object. As described above, the human detection device 1 can accurately detect the human body, including the posture and motion of a person.

Others

The above description of the embodiment merely illustrates the configuration example of the present invention. The present invention is not limited to the above specific embodiments, but various modifications are possible within the scope of the technical idea thereof. For example, the values in the table illustrated in FIG. 7, the thresholds shown in the above embodiment, and the like are merely examples for description. In the above embodiment, the rectangular bounding boxes have been exemplified, but bounding boxes in a form other than a rectangle (polygon, ellipse, free figure, etc.) may be used.

APPENDIX 1

(1) A human detection device (1) that analyzes a fisheye image obtained by a fisheye camera (10) installed above a detection target area (11) to detect a person (13) present in the detection target area, the human detection device including:

a detector (21) configured to detect a human body candidate and an object present around the human body candidate from a fisheye image; and an erroneous detection determination unit (25) configured to determine whether or not the human body candidate has been erroneously detected based on a positional relationship between a detection position of the human body candidate and a detection position of the object present around the human body candidate.

(2) A human detection device (1) that analyzes a fisheye image obtained by a fisheye camera (10) installed above a detection target area (11) to detect a person (13) present in the detection target area, the human detection device including:

a detector (21) configured to detect a human body candidate and an object present around the human body candidate from a fisheye image; and a posture estimator (27) configured to estimate a posture of the human body candidate based on a positional relationship between a detection position of the human body candidate and a detection position of the object present around the human body candidate.

(3) A human detection method for analyzing a fisheye image obtained by a fisheye camera (10) installed above a detection target area (11) to detect a person (13) present in the detection target area, the human detection method including:

a detection step (S41) of detecting a human body candidate and an object present around the human body candidate from a fisheye image; and an erroneous detection determination step (S42) of determining whether or not the human body candidate has been erroneously detected based on a positional relationship between a detection position of the human body candidate and a detection position of the object present around the human body candidate.

DESCRIPTION OF SYMBOLS 1 human detection device
2 monitoring system
10 fisheye camera
11 detection target area
12 ceiling
13 person

The invention claimed is:

1. A human detection device that analyzes a fisheye image obtained by a fisheye camera installed above a detection target area to detect a person present in the detection target area, the human detection device comprising:

a detector configured to detect a human body candidate and an object from a fisheye image; and an erroneous detection determination unit configured to determine whether the human body candidate is erroneously detected, wherein the detector specifies a type of the object, wherein the detector sets an excluded region of the object based on the type, and wherein the erroneous detection determination unit determines whether the human body candidate is erroneously detected based on a positional relationship between a detection position of the human body candidate, a detection position of the object present around the human body candidate, and the excluded region of the object.

2. The human detection device according to claim 1, wherein the erroneous detection determination unit determines whether the human body candidate is erroneously detected based on a ratio at which a region surrounding the human body candidate overlaps a region surrounding the object or the excluded region of the object.

3. A human detection device that analyzes a fisheye image obtained by a fisheye camera installed above a detection target area to detect a person present in the detection target area, the human detection device comprising:

a detector configured to detect a human body candidate and an object from a fisheye image;

an erroneous detection determination unit configured to determine whether the human body candidate is erroneously detected; and a posture estimator configured to estimate a posture of the human body candidate based on a positional relationship between a detection position of the human body candidate and a detection position of the object present around the human body candidate, wherein the detector specifies a type of the object, wherein the detector sets an excluded region of the object based on the type, and wherein the erroneous detection determination unit determines whether the human body candidate is erroneously detected based on a positional relationship between the detection position of the human body candidate, the detection position of the object present around the human body candidate, and the excluded region of the object.

4. The human detection device according to claim 3, wherein the posture estimator estimates a motion of the human body candidate based on a change, from a frame before the fisheye image, in the positional relationship between the detection position of the human body candidate and the detection position of the object.

5. A human detection method for analyzing a fisheye image obtained by a fisheye camera installed above a detection target area to detect a person present in the detection target area, the human detection method comprising:

a detection step of detecting a human body candidate and an object from a fisheye image; and an erroneous detection determination step of determining whether the human body candidate is erroneously detected, wherein the detection step specifies a type of the object, wherein the detection step sets an excluded region of the object based on the type, and wherein the erroneous detection determination step determines whether the human body candidate is erroneously detected based on a positional relationship between a detection position of the human body candidate, a detection position of the object present around the human body candidate, and the excluded region of the object.

6. A non-transitory computer-readable medium storing a program for causing a computer to execute each of the steps of the human detection method according to claim 5.

* * * * *